US012579716B2

(12) United States Patent
Chen et al.

(10) Patent No.: US 12,579,716 B2
(45) Date of Patent: Mar. 17, 2026

(54) MRI RECONSTRUCTION BASED ON CONTRASTIVE LEARNING

(71) Applicant: Shanghai United Imaging Intelligence Co., Ltd., Shanghai (CN)

(72) Inventors: Zhang Chen, Brookline, MA (US); Shanhui Sun, Lexington, MA (US); Xiao Chen, Lexington, MA (US); Yikang Liu, Cambridge, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 313 days.

(21) Appl. No.: 18/391,500

(22) Filed: Dec. 20, 2023

(65) Prior Publication Data

US 2025/0209689 A1 Jun. 26, 2025

(51) Int. Cl.
*G06T 11/00* (2006.01)
*G06T 3/4046* (2024.01)

(52) U.S. Cl.
CPC .......... *G06T 11/006* (2013.01); *G06T 3/4046* (2013.01); *G06T 2210/41* (2013.01); *G06T 2211/441* (2023.08)

(58) Field of Classification Search
None
See application file for complete search history.

(56) References Cited

U.S. PATENT DOCUMENTS

| | | | | |
|---|---|---|---|---|
| 10,818,009 B2 * | 10/2020 | Zhou | .......................... | G06T 5/73 |
| 11,120,585 B2 * | 9/2021 | Chen | ...................... | G06N 3/094 |
| 11,823,307 B2 * | 11/2023 | Sandino | .............. | A61B 5/0515 |
| 11,941,732 B2 * | 3/2024 | Chen | .................... | A61B 5/7267 |
| 11,966,454 B2 * | 4/2024 | Chen | ...................... | G16H 30/20 |
| 12,315,047 B2 * | 5/2025 | Arberet | .................... | G06N 3/04 |
| 12,412,324 B2 * | 9/2025 | Chen | ....................... | G06T 5/50 |
| 2021/0166446 A1 * | 6/2021 | Chen | ........................ | G06N 3/08 |
| 2021/0224634 A1 * | 7/2021 | Chen | ...................... | G06N 3/045 |
| 2022/0215600 A1 * | 7/2022 | Arberet | ................ | G06N 3/0464 |
| 2022/0299588 A1 * | 9/2022 | Zhu | ..................... | G01R 33/5611 |
| 2022/0375141 A1 * | 11/2022 | Sandino | .............. | A61B 5/0515 |
| 2023/0024401 A1 * | 1/2023 | Shen | ..................... | G06T 11/006 |
| 2023/0135995 A1 * | 5/2023 | Chen | ..................... | G06T 7/0012 |
| | | | | 382/131 |
| 2023/0138380 A1 * | 5/2023 | Chen | ................... | G06F 18/2148 |
| | | | | 382/131 |
| 2024/0355011 A1 * | 10/2024 | Kang | ..................... | G06T 11/005 |
| 2024/0362835 A1 * | 10/2024 | Arberet | .............. | G01R 33/5608 |

* cited by examiner

*Primary Examiner* — Anand P Bhatnagar
(74) *Attorney, Agent, or Firm* — Zhong Law, LLC

(57) ABSTRACT

Disclosed herein are systems, methods, and instrumentalities associated with MRI image reconstruction. According to embodiments of the disclosure, an apparatus configured to perform the MRI image reconstruction task may be configured to obtain an under-sampled MRI image and generate a reconstructed MRI image based on the under-sampled MRI image and a machine-learned (ML) model. The ML model may be trained via contrastive learning, during which randomly selected locations of the reconstructed MRI data generated by the ML model may be replaced with values that are different than the under-sampled MRI data, and the MRI data thus derived may be used as a negative example for the training.

20 Claims, 7 Drawing Sheets

MRI RECONSTRUCTION BASED ON CONTRASTIVE LEARNING

BACKGROUND

Magnetic resonance imaging (MRI) is an important tool for investigating medical issues and planning treatments, but MRI scanning procedures are inherently slow. To accelerate the imaging process, techniques may be employed to under-sample an MRI data space (e.g., which may be referred to as a k-space) and reconstruct an MRI image based on the under-sampled data. In recent years, machine learning (ML) models have been increasingly used for MRI reconstruction, but the images obtained using these models often lack details (e.g., high-frequency details), causing the images to be blurry. Accordingly, there is a need to create improved ML models for MRI reconstruction.

SUMMARY

Disclosed herein are systems, methods, and instrumentalities associated with MRI image reconstruction. According to embodiments of the disclosure, an apparatus may be configured to obtain under-sampled MRI data and reconstruct the under-sampled MRI data into a reconstructed MRI image based on a machine-learned (ML) model. The ML model may be trained via contrastive learning, wherein, during the contrastive learning, the ML model may be used to generate a reconstructed MRI dataset based on an under-sampled MRI dataset, and the parameters of the ML model may be adjusted based at least on an anchor example and a negative example. The anchor example may be derived by replacing a portion of the reconstructed MRI dataset with the under-sampled MRI dataset. The negative example may be the reconstructed MRI dataset or may be derived by replacing the portion of the reconstructed MRI dataset with date values that are at least partially different from the under-sampled MRI dataset.

In some embodiments, the parameters of the ML model may be adjusted further based on a positive example that is derived from a ground truth MRI dataset. In some embodiments, the parameters of the ML model may be adjusted during the contrastive learning to make the anchor example substantially similar to the positive example, and to make anchor example substantially different from the negative example. In some embodiments, the parameters of the ML model may be adjusted based on a loss calculated based on the anchor example, the negative example, and the positive example.

In some embodiments, the under-sampled MRI dataset described herein may include observed MRI data values at a plurality of sampling locations of an MRI data space. The reconstructed MRI dataset may include estimated MRI data values that correspond to the plurality of sampling locations of the MRI data space and a plurality of non-sampling locations of the MRI data space. The anchor example may be derived by replacing the estimated MRI data values of the reconstructed MRI dataset that correspond to the plurality of sampling locations with the observed MRI data values at the plurality of sampling locations. In some embodiments, the negative example may be derived by replacing the estimated MRI data values of the reconstructed MRI dataset that correspond to one or more randomly selected sampling locations with data values that are different from the observed MRI data values at the one or more randomly selected sampling locations.

In some embodiments, the anchor example may be derived by applying a first mask to the reconstructed MRI dataset and the under-sampled MRI dataset. The negative example may be derived by applying a second mask to the reconstructed MRI dataset and the under-sampled MRI dataset. The first mask may include a first plurality of coefficients corresponding to a plurality of locations of an MRI data space. The second mask may include a second plurality of coefficients corresponding to the plurality of locations of the MRI data space. The first plurality of coefficients may differ from the second plurality of coefficients at one or more of the plurality of locations. For example, the first plurality of coefficients at the one or more locations may have a value of 1, and the second plurality of coefficients at the one or more locations may have a value smaller than 1.

In some embodiments, the anchor example and the negative example used for the contrastive learning may be generated at a data consistency (DC) module (or layer) associated with the ML model.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings. A detailed description of illustrative embodiments will now be provided with reference to these figures. Although the embodiments may be described with certain technical details, it should be noted that the details are not intended to limit the scope of the disclosure. And while some embodiments may be provided in the context of magnetic resonance imaging (MRI), those skilled in the art will understand that the techniques disclosed in those embodiments can also be used to process other types of medical images such as, e.g., X-ray images, computed tomography (CT) images, photoacoustic tomography (PAT) images, etc.

Figure 1:
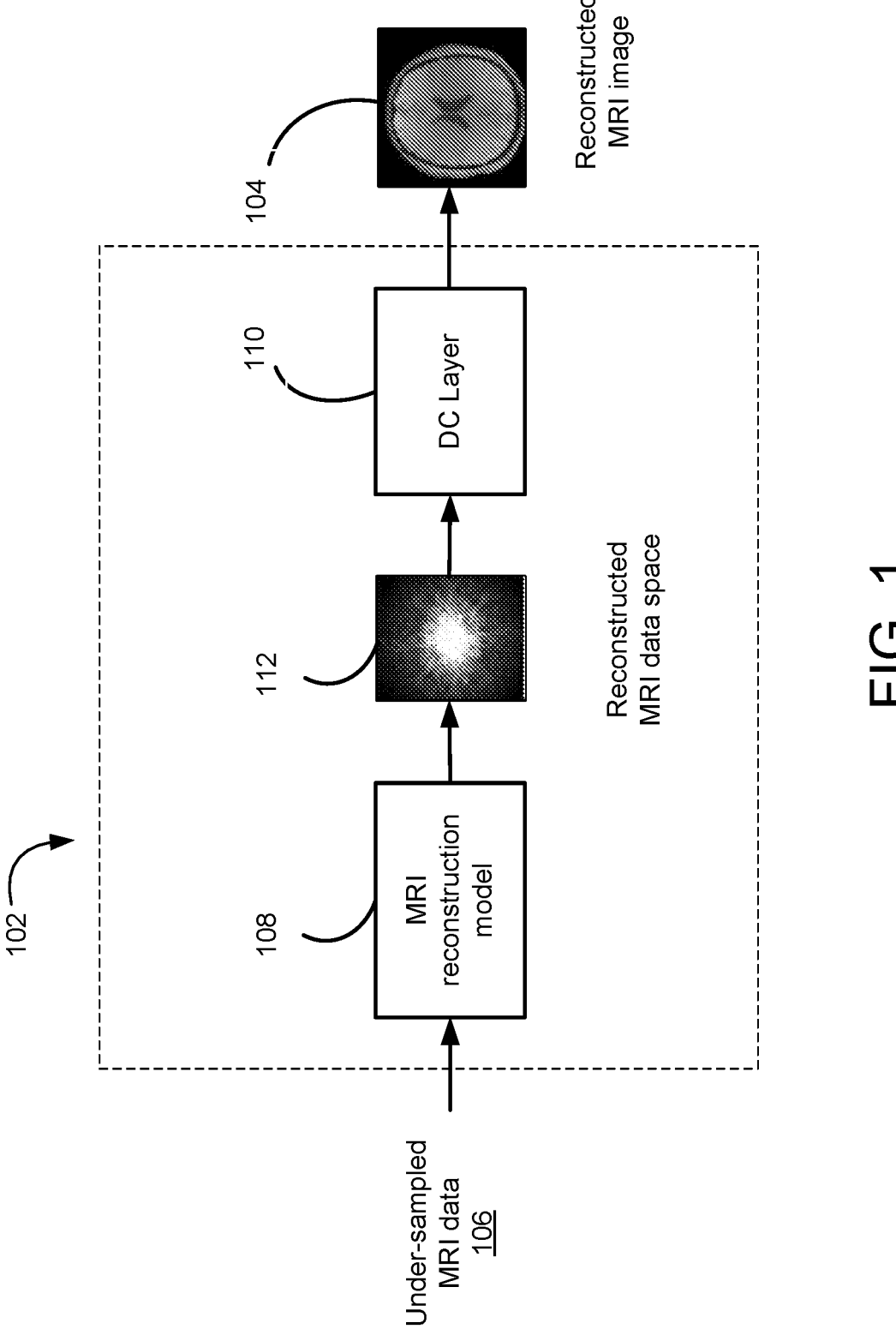
FIG. 1 is a simplified block diagram illustrating example operations that may be associated with MR image reconstruction according to one or more embodiments of the present disclosure.

FIG. 1 illustrates example operations that may be associated with MRI reconstruction (also referred to herein as "MRI Recon"). MRI images (e.g., two-dimensional (2D) or three-dimensional (3D) MRI images) of an anatomical structure (e.g., such as a human brain, a human heart, etc.) may be generated based on spatial, frequency, and/or phase information collected by an MRI scanner. Such information may be referred to herein as MRI data or an MRI data space. The MRI images (e.g., fully sampled MRI images) of the anatomical structure may be generated by fully sampling the MRI data space (also referred to herein as a k-space), but such a process may be prohibitively slow (e.g., due to physical limitations of the MRI scanner) to accommodate clinical needs. To accelerate the imaging process, a sampling pattern may be used to under-sample the MRI data and obtain under-sampled MRI data (e.g., corresponding to a plurality of sampling locations). The sampling pattern may include, for example, a sampling mask (e.g., a binary sampling mask comprising zeros and ones) that may indicate where data should be collected from the MRI data space. The under-sampling may serve the purpose of accelerating the imaging process, but may cause negative effects to the resulting MRI image including, for example, noise, aliasing artifacts, blurriness, and/or the like.

As illustrated in FIG. 1, a machine learning (ML) model 102 may be trained to generate (e.g., reconstruct) an output image 104 of the anatomical structure based on under-sampled MRI data 106 (e.g., an under-sampled MRI image) to eliminate or at least reduce the negative effects caused by the MRI data under-sampling. The output image 104 may recover fine details missing from under-sampled MRI data 106 (e.g., the output image 104 may resemble a fully sampled MRI image) and may thus have better quality than the under-sampled MRI image that corresponds to under-sampled MRI data 106 with respect to one or more of a noise level, amount of aliasing, blurriness, etc. As will be described in greater detail below, ML model 102 may, through training, acquire the ability to identify key and/or detailed features of the anatomical structure based on under-sampled MRI data 106 and may utilize these features to improve the quality of the output image 104 (e.g., to recover the fine details of the anatomical structure that may be lost due to the under-sampling process).

In examples, ML model 102 may include an MRI reconstruction model 108. As mentioned above, the under-sampling operation may cause the resulting image to miss certain details (e.g., high-frequency details) and/or exhibit aliasing artifacts. To recover the missing details and/or to reduce the artifacts, under-sampled MR data 106 may be subject to an image reconstruction process during which MRI reconstruction model 108 may be used to enhance the quality of the under-sampled MR data to obtain reconstructed MRI image 104.

In examples, MRI reconstruction model 108 may employ a recurrent neural network (RNN) structure, a cascaded neural network structure, or other suitable types of neural network structures. Using an RNN as an example, the RNN may include an input layer, an output layer, a plurality of hidden layers (e.g., convolutional layers), and connections that feed the hidden layers back into themselves (e.g., the connections may be referred to as recurrent connections). The recurrent connections may provide the RNN with visibility of not only the current data sample the RNN has been provided with, but also previous hidden states (e.g., the feedback mechanism of the RNN may be visualized as multiple copies of a neural network, with the output of one serving as an input to the next). As such, the RNN may use its understanding of past events to process a current input rather than starting from scratch every time. In examples, the RNN may include a plurality of convolutional layers, each of which may, in turn, include a plurality of convolution kernels or filters having respective weights (e.g., corresponding to the parameters of a ML model implemented through the RNN) that may be configured to extract features from an input MR image (e.g., an under-sampled MR image). The convolution operations may be followed by batch normalization and/or an activation function (e.g., such as a rectified linear unit (ReLu) activation function), and the features extracted by the convolutional layers may be down-sampled through one or more pooling layers and/or one or more fully connected layers to obtain a representation of the features, e.g., in the form of a feature map or a feature vector. In examples, the RNN may further include one or more un-pooling layers and one or more transposed convolutional layers. Through these un-pooling layers and/or transposed convolutional layers, the features extracted from the input image may be up-sampled and further processed (e.g., through a plurality of deconvolution operations) to derive an up-scaled or dense feature map or feature vector. The dense feature map or vector may then be used to predict a correction that may be applied to an image generated from a previous iteration to obtain a refined MRI image.

In examples, MRI reconstruction model 108 may be aided by a data consistency (DC) layer or module 110 (e.g., a computer program comprising a sequence of machine-readable instructions) configured to refine the MRI data 112 (e.g., a reconstructed MRI data space including a plurality of sampling locations and a plurality of non-sampling locations) generated by MRI reconstruction model 108 before the refined MRI data is used to generate output MRI image 104. As will be described in greater detail below, DC layer 110 may be configured to refine MRI data 112 by replacing a portion of the MRI data 112 reconstructed by MRI reconstruction model 108 with under-sampled MRI data 106 (e.g., so as to constrain the reconstructed MRI data to match the k-space acquired via under-sampling at the sampling locations). It should be noted here that MRI data or an MRI data space may be converted into a corresponding MRI image by applying an inverse fast Fourier transform (iFFT) to the MRI data space. Conversely, based on an MRI image, a corresponding MRI data space may be obtained by applying a fast Fourier transform (FFT) to the MRI image. Because FFT and iFFT are invertible, the term "MRI data" or "MRI data space" may be used interchangeably herein with the term "MRI image" without affecting the applicability and scope of the disclosure. It should also be noted here that, while DC layer 110 is shown as being part of ML model 102 in FIG. 1, those skilled in the art will appreciate that, in some examples, DC layer 110 may be separate from (e.g., not being part of) ML model 102.

Figure 2:
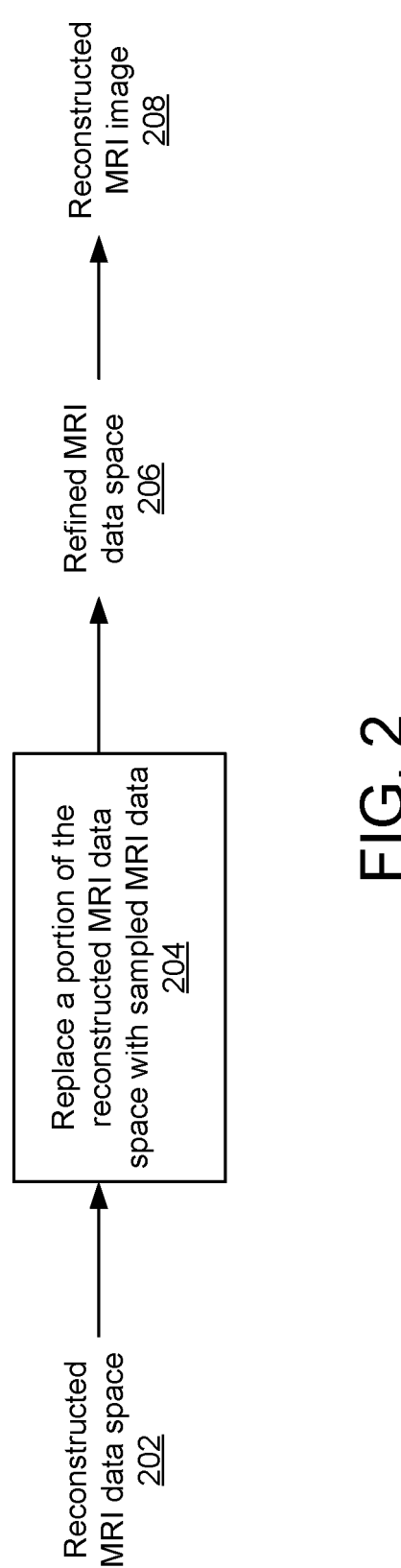
FIG. 2 is a simplified block diagram illustrating example operations that may be performed by a DC module or layer for reconstructing an MRI image according to one or more embodiments of the present disclosure.

FIG. 2 illustrates example operations that may be performed using a DC module or layer (e.g., DC layer 110 in FIG. 1) or another suitable functional module during an MRI image reconstruction task. These operations may be illustrated by equation 1) below:

$$\text{Refined } recon\ k\text{-space} = \qquad\qquad 1)$$

$$Recon\ k\text{-space} * (1 - \text{mask}) + \text{Originally acquired } k\text{-space} * \text{mask}$$

"Recon k-space" in the equation may correspond to a reconstructed MRI data space (e.g., reconstructed MRI data space 112 of FIG. 1, which may include estimated MRI data values at a plurality of sampling locations and non-sampling locations) predicted by an MRI reconstruction model (e.g., MRI reconstruction model 108 of FIG. 1). "Originally acquired k-space" in the equation may correspond to an under-sampled k-space (e.g., under-sampled MRI data 106 of FIG. 1, which may include actually observed MRI data at the sampling locations), where non-sampled locations may have zero values, and "Refined recon k-space" in the equation may correspond to a refined MRI data space that is used to generate a reconstructed MRI image 208 (e.g., output image 104 of FIG. 1). As such, "Refined recon k-space" may be considered as a linear combination of "Recon k-space" and "Originally acquired k-space," wherein "mask" in the equation may provide coefficients for the linear combination. In examples, the mask may be a binary mask (e.g., comprising values of 1 s at the sampling locations and values of 0 s at the non-sampled locations) such that the DC module or layer may operate to replace the MRI data space predicted by the MRI reconstruction model with the originally acquired MRI data space at the sampling locations (e.g., to maintain consistency with the originally acquired MRI data). For example, a value of 0 in the mask may indicate that the MRI value predicted by the MRI reconstruction model at a corresponding location is kept unchanged (e.g., not replaced by a corresponding sample value), and a value of 1 in the mask may indicate that the MRI value predicted by the MRI reconstruction model at a corresponding location is replaced by a corresponding value from the originally acquired MRI data space. In examples, the mask shown in equation 1) may be a non-binary mask (e.g., including values that fall between 0 and 1) such that equation 1) may be used to perform a linear interpolation between the reconstructed MRI data space predicted by the MRI reconstruction model and the originally acquired MRI data space, wherein the weights used for the linear interpolation may be defined by values of the mask.

In at least the context of a direct replacement described above, since the predictions made by the ML reconstruction model at the sample locations are replaced with the originally acquired values (e.g., under-sampled values), it may lead to a loss of supervision for those locations. In other words, the ML model may not learn the intricacies of signal recovery at those locations and consequently efficient learning during the training of the ML model may be hindered. The loss of supervision signals from the replaced locations may also cause a long convergence time for the ML model.

To address the aforementioned issue in ML model training, the DC module or layer (or another suitable functional module) may employ a dropout approach to create a negative example for the training, from which the ML model may learn behaviors that it should avoid during the reconstruction of an MRI image. Such a training technique may be referred to herein as contrastive learning and, in addition to the aforementioned negative example, the training may also utilize a refined MRI data space (e.g., 206 of FIG. 2) generated using the techniques shown in FIG. 2 as an anchor example and a ground truth MRI data space (e.g., a fully sampled MRI data space) as a positive example. Based on these examples, the training (e.g., contrastive learning) may be accomplished by applying a contrastive loss function to examples, so that a difference between the anchor example and the positive example may be minimized, and a difference between the anchor example and the negative example may be maximized.

In examples, the contrast loss function used for the training may include a triplet loss function, an informational noise-contrastive estimation (InfoNCE) loss function, a distance-based loss function, a cosine similarity based loss function, and/or the like. Based on the loss calculated using one or more of these loss functions, the parameters (e.g., weights) of the MRI reconstruction model (e.g., 108 in FIG. 1) may be adjusted with an objective to maximize the similarity (e.g., minimize the difference) between the anchor example (e.g., refined MRI data space 206 in FIG. 2) and the positive examples (e.g., ground truth), and to minimize the similarity (e.g., maximize the difference) between the anchor example and the negative example (e.g., a reconstructed MRI data space without applying data consistency or a reconstructed MRI data space created via random dropout, as will be described further below). It should be noted here that the negative example creation described herein may be relevant only to the training of the ML reconstruction model. Once the model is trained, the DC module (or another suitable functional module) may operate as illustrated by FIG. 2 during MRI reconstruction (e.g., without applying any random dropout of acquired MRI samples).

Figure 3:
FIG. 3 is a simplified block diagram illustrating an example of deriving a negative example for training an MRI reconstructing model according to one or more embodiments of the present disclosure.

FIG. 3 illustrates an example of applying (e.g., by a DC module) random dropout to create a negative example for training an ML reconstruction model (e.g., MRI reconstruction model 104 in FIG. 1). As shown in FIG. 3, the dropout may involve receiving reconstructed MRI data 302 (e.g., a reconstructed MRI image generated by the ML reconstruction model), randomly selecting locations from the portion of the reconstructed MRI data that corresponds to actually acquired or observed MRI data (e.g., under-sampled MRI values at a plurality of sampling locations) for dropout at 304, and using the alternative MRI data space derived based on the random dropout as a negative example for the model training at 306.

In examples, the random dropout may be applied by randomly selecting locations from the mask shown in equation 1 and changing the values at those locations to be different from those normally applied by the DC module. This operation may introduce variability to the training of the ML model, potentially resulting in a reconstructed output with reduced information from the originally acquired data, from which the ML model may learn behaviors that it should avoid. For example, if the mask is a binary mask comprising values of 0 s and 1 s indicating whether to replace a reconstructed value with an actually acquire value, the random dropout may set the values at some locations of the mask to zero instead one so that the reconstructed MRI values at those locations may be left unchanged (e.g., not replaced by the actually observed MRI sample values). In examples, all of the data values at the actually observed locations (e.g., sampling locations) may be maintained, in which case, the negative example would be the reconstructed MRI dataset without any replacement by the DC module.

If the mask is a non-binary mask comprising values between 0 and 1, the random dropout may assume a softer form, reducing the values at the randomly selected locations (or all of the locations) of the mask or setting those values to 0, so that the corresponding reconstructed MRI data space at those randomly selected locations may be set to values that are different than actually observed values (e.g., different than under-sampled MRI values). So, if a refined MRI data space (e.g., 206 of FIG. 2) created via normal operations of the DC module is considered as a first linear combination of the MRI data reconstructed by the MRI reconstruction model and the under-sampled MRI data (e.g., by applying a first mask to the reconstructed MRI data and the under-sampled MRI data), the negative example used for the contrastive learning may be considered as a second linear combination of the MRI data reconstructed by the MRI reconstruction model and the under-sampled MRI data (e.g., by applying a second mask to the reconstructed MRI data and the under-sampled MRI data), wherein the second linear combination (e.g., the second mask) may differ from the first linear combination (e.g., the first mask) with respect to coefficients (e.g., values between 0 and 1) applied at one or more locations (e.g., the randomly selected locations). In the example described above, the coefficients applied for the first linear combination may have a value of 1, whereas the coefficients applied for the second linear combination may have a value smaller than 1 (e.g., the values may be zero).

As shown in FIG. 3, by employing the dropout operation described above, the DC module (or another suitable functional module) may generate an alternative MRI data space that includes different (e.g., less) information than the reconstructed MRI data predicted by the ML model, and the alternative MRI data space may be used as negative example 306 (e.g., in addition to the anchor and positive examples described herein) to train the ML model. For example, the refined MRI data space 206 created via normal operations of the DC module, as shown in FIG. 2, may serve as an anchor example for the training, and ground truth MRI data space may serve as a positive example for the training. Utilizing a contrastive learning approach, the training may be performed by maximizing a difference between the anchor example (e.g., the refined MRI data space generated via normal DC operation) and the negative example (e.g., the MRI data space generated via random dropout), while minimizing a difference between the anchor example and the positive example (e.g., the ground truth). In examples, the training of the MRI reconstruction model may include multiple rounds or iterations. During these iterations, parameters associated with the MRI reconstruction model may be updated based on the maximizing and minimizing, so that the output of the MRI reconstruction model may be pushed away from the negative example and pulled towards the positive example.

Figure 4:
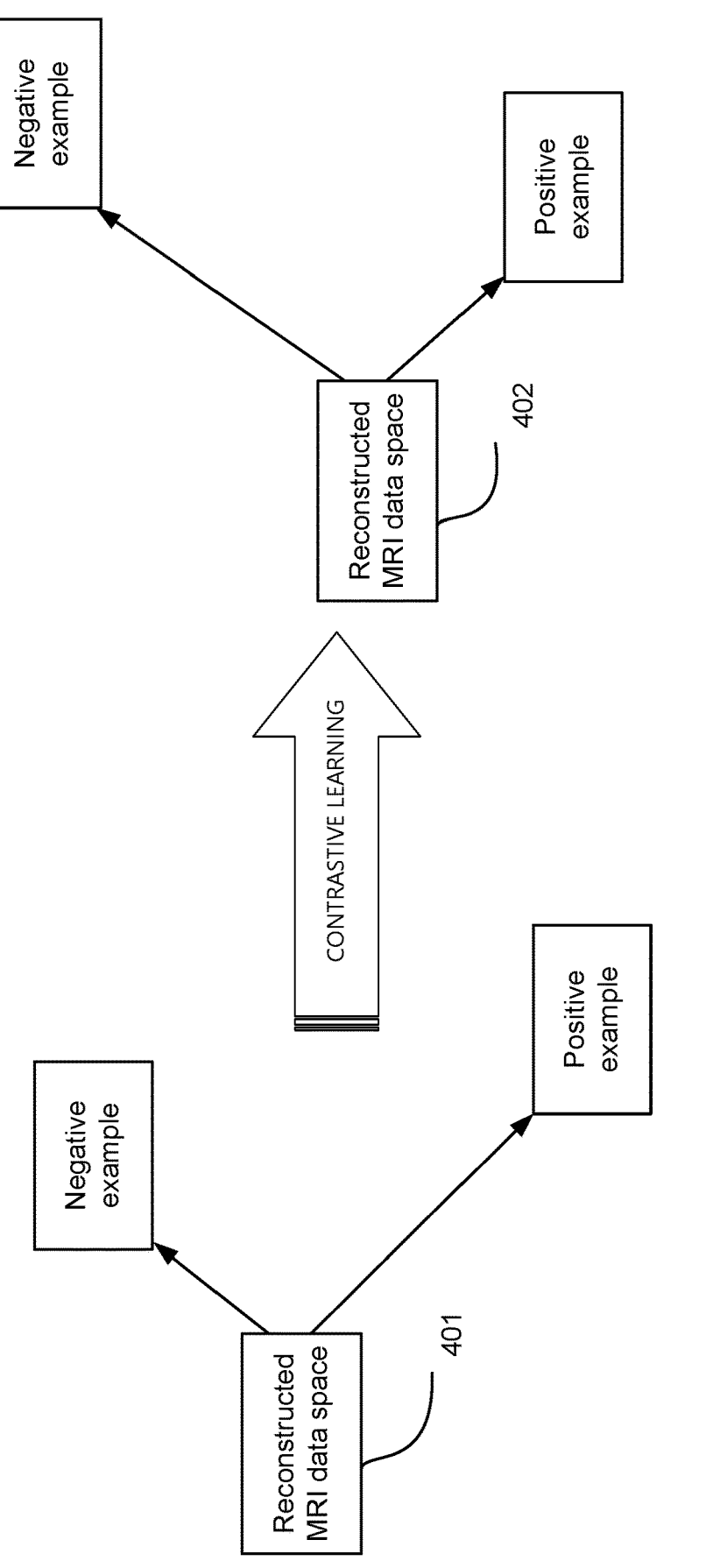
FIG. 4 is a simplified diagram illustrating an example of contrastive learning according to one or more embodiments of the present disclosure.

FIG. 4 illustrating an example of using contrastive learning to train an MRI reconstruction model as described herein (e.g., 104 in FIG. 1). As shown in FIG. 4, a reconstructed MRI data space 4020 may be generated by the MRI reconstruction model, for example, during an iteration of the training. During the training/learning process of the MRI reconstruction model, the parameters (e.g., weights) of the MRI reconstruction model may be adjusted based on a contrastive learning function (e.g., such as a triplet loss function, together with other reconstruction related loss functions such as L1, L2 or structural similarity index (SSIM)) such that reconstructed MRI data space 402 may be pulled closer to a positive example (e.g., ground truth MRI data space such as a fully sampled MRI data space) and farther away from a negative example (e.g., an alternative MRI data space created using the random dropout technique described herein) compared to a previously generated reconstructed MRI data space 401. The contrastive loss function may be expressed, for example, as:

$$L = \max(d(\text{refined } MRI \text{ data space}, P) -$$
$$d(\text{refined } MRI \text{ data space}, N) + \text{margin}, 0)$$

wherein "refined MRI data space" may represent an MRI data space generated by the MRI reconstruction model and refined via a DC module or layer, "margin" may be a configurable parameter that forces the respective distances (d) between the refined MRI data space and P (e.g., positive example), and between the refined MRI data space and N (e.g., negative example), to be larger than the margin. The loss function may be minimized so that d (refined MRI data space, P) is pushed towards 0 and while d (refined MRI data space, N) is pushed towards d (refined MRI data space, P)+margin. Accordingly, after each training iteration, MRI data space 402 may be closer to the positive example than previously generated MRI data space 401, and further away from the negative example than previously generated MRI data space 401.

Figure 5:
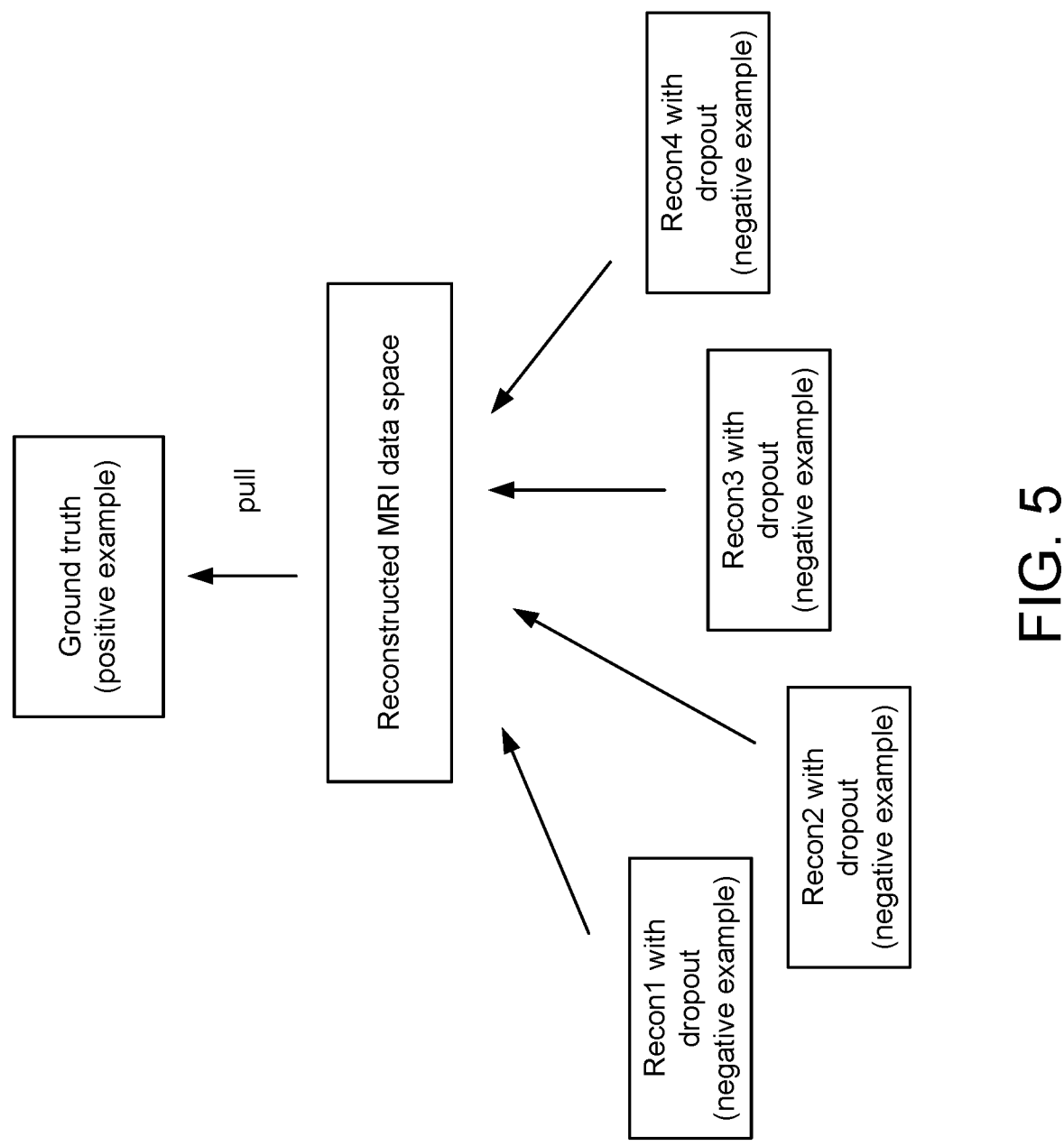
FIG. 5 is a simplified diagram illustrating an example of using multiple negative samples for contrastive learning according to one or more embodiments of the present disclosure.

It should be noted that, although one positive example and one negative example are shown in FIG. 4, those skilled in the art will appreciate that the training of the MRI reconstruction model may use more examples than shown in the figure. For instance, as shown in FIG. 5, multiple negative examples may be created and applied to push the MRI data reconstructed by the MRI reconstruction model away from the negative examples, and towards a positive example.

Figure 6:
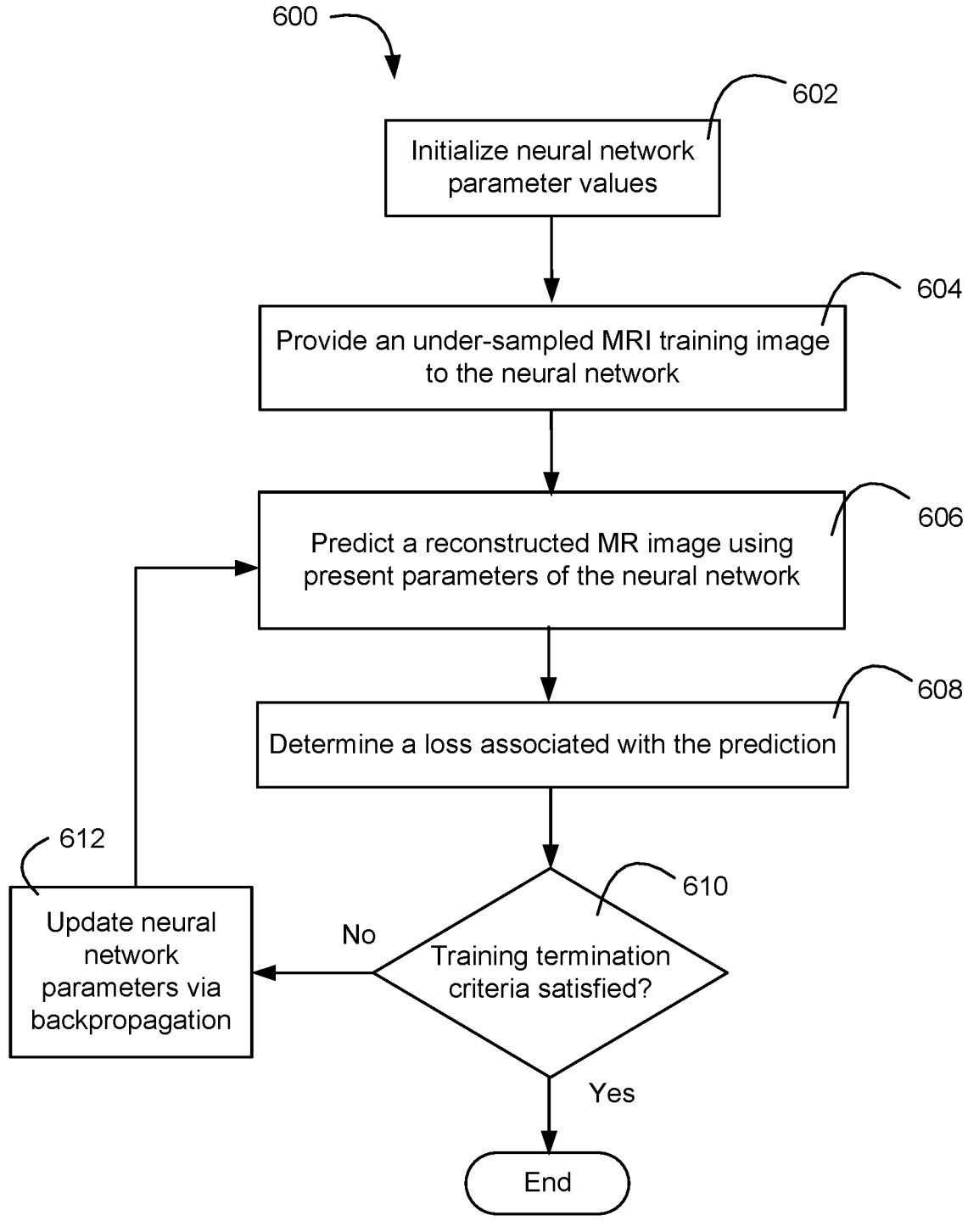
FIG. 6 is a simplified flow diagram illustrating an example process for training an artificial neural network to perform an MRI image reconstruction task according to one or more embodiments of the present disclosure.

FIG. 6 illustrates example operations 600 associated with training an artificial neural network (e.g., which may implement the MRI reconstruction model described herein) to perform one or more of the tasks described herein. As shown in FIG. 6, training operations 600 may include initializing the operating parameters of the neural network (e.g., weights associated with various layers of the neural network) at 602, for example, by sampling from a probability distribution or by copying the parameters of another neural network having a similar structure. The training operations may further include providing one or more first inputs (e.g., an under-sampled MRI image) to the neural network at 604 and causing the neural network to make a prediction for a reconstructed MRI image using presently assigned network parameters at 606.

At 608, the neural network may perform one or more of the following operations. The neural network may generate (e.g., via a DC module or another suitable functional module as described herein) a negative example for the training using the random dropout technique described herein. The neural network may then determine contrastive loss based on the negative example, the reconstructed MRI image predicted at 606 (e.g., as an anchor), and a ground truth MRI image (e.g., as a positive example), for example, using a triplet loss function. At 610, the neural network may determine whether one or more training termination criteria are satisfied. For example, the neural network may determine that the training termination criteria are satisfied if the similarity between the positive and anchor examples is small enough (e.g., compared to a threshold value) or if the dissimilarity between the negative and anchor example is large enough (e.g., compared to a threshold value). If the determination at 610 is that the training termination criteria are satisfied, the training may end. Otherwise, the presently assigned network parameters may be adjusted at 612, for example, by backpropagating a gradient descent of the loss through the network, before the training returns to 606.

For simplicity of explanation, the training operations are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 7:
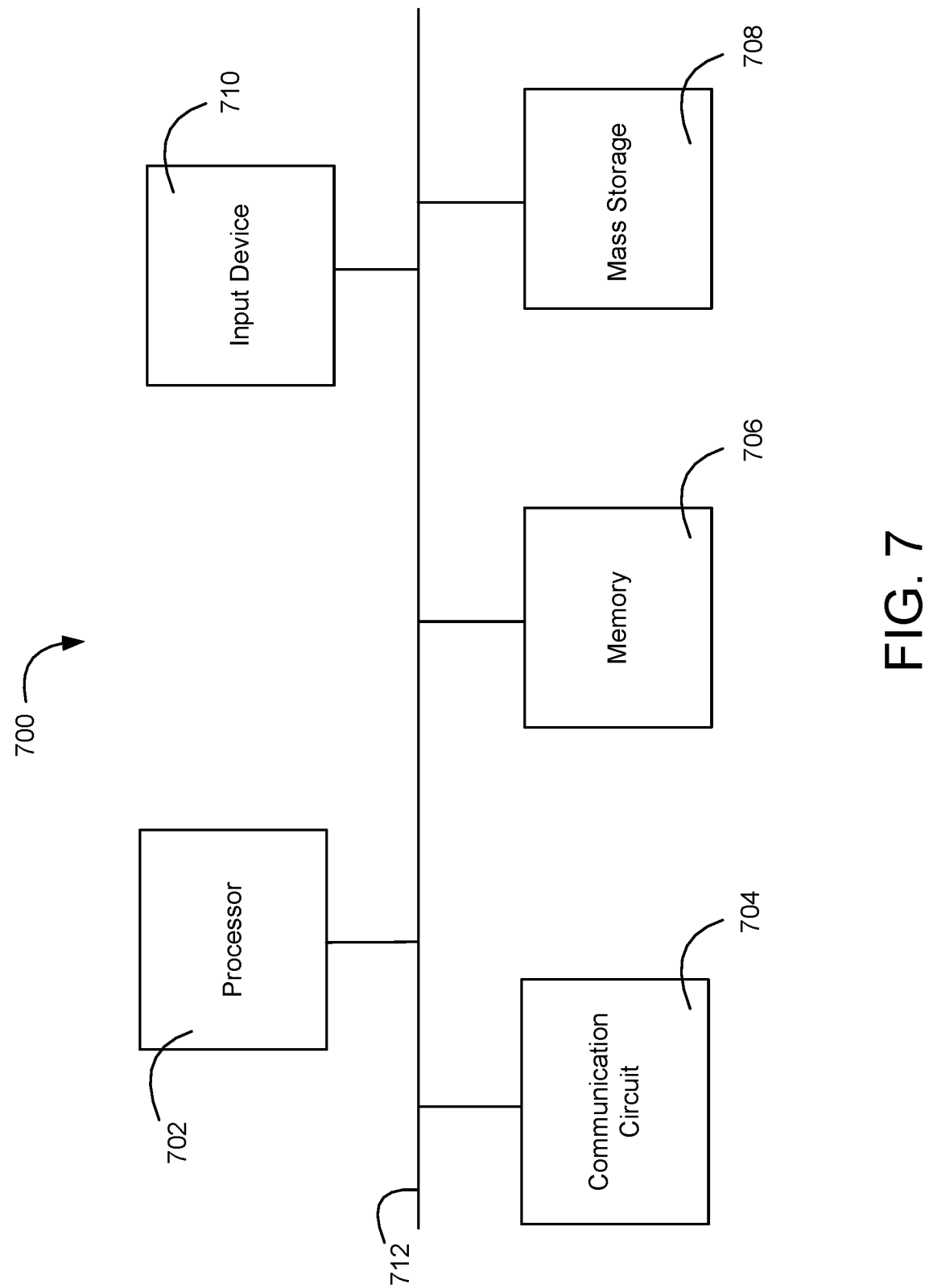
FIG. 7 is a simplified block diagram illustrating example components of an apparatus that may be configured to perform an MRI image reconstruction task according to one or more embodiments of the present disclosure.

The systems, methods, and/or instrumentalities described herein may be implemented using one or more processors, one or more storage devices, and/or other suitable accessory devices such as display devices, communication devices, input/output devices, etc. FIG. 7 is a block diagram illustrating an example apparatus 700 that may be configured to perform the tasks described herein. As shown, apparatus 700 may include a processor (e.g., one or more processors) 702, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 700 may further include a communication circuit 704, a memory 706, a mass storage device 708, an input device 710, and/or a communication link 712 (e.g., a communication bus) over which the one or more components shown in the figure may exchange information.

Communication circuit 704 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 706 may include a storage medium (e.g., a non-transitory storage medium) configured to store machine-readable instructions that, when executed, cause processor 702 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 708 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 702. Input device 710 may include a keyboard, a mouse, a voice-controlled input device, a touch sensitive input device (e.g., a touch screen), and/or the like for receiving user inputs to apparatus 700.

It should be noted that apparatus 700 may operate as a standalone device or may be connected (e.g., networked, or clustered) with other computation devices to perform the functions described herein. And even though only one instance of each component is shown in FIG. 7, a skilled person in the art will understand that apparatus 700 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
 one or more processors configured to:
  obtain under-sampled magnetic resonance imaging (MRI) data; and
  reconstruct the under-sampled MRI data into a reconstructed MRI image based on a machine learning (ML) model, wherein the ML model is trained via contrastive learning during which:
   the ML model is used to generate a reconstructed MRI dataset based on an under-sampled MRI dataset; and
   parameters of the ML model are adjusted based at least on an anchor example and a negative example, wherein the anchor example is derived by replacing a portion of the reconstructed MRI dataset with the under-sampled MRI dataset, and wherein the negative example is the reconstructed MRI dataset or is derived by replacing the portion of the reconstructed MRI dataset with date values that are at least partially different from the under-sampled MRI dataset.

2. The apparatus of claim 1, wherein the parameters of the ML model are adjusted further based on a positive example derived from a ground truth MRI dataset.

3. The apparatus of claim 2, wherein the parameters of the ML model are adjusted during the contrastive learning to make the anchor example substantially similar to the positive example.

4. The apparatus of claim 3, wherein the parameters of the ML model are adjusted during the contrastive learning to make the anchor example substantially different from the negative example.

5. The apparatus of claim 2, wherein the parameters of the ML model are adjusted based on a loss calculated based on the anchor example, the negative example, and the positive example.

6. The apparatus of claim 1, wherein the under-sampled MRI dataset includes observed MRI data values at a plurality of sampling locations of an MRI data space, wherein the reconstructed MRI dataset includes estimated MRI data values that correspond to the plurality of sampling locations of the MRI data space and a plurality of non-sampling locations of the MRI data space, and wherein the anchor example is derived by replacing the estimated MRI data values of the reconstructed MRI dataset that correspond to the plurality of sampling locations with the observed MRI data values at the plurality of sampling locations.

7. The apparatus of claim 6, wherein the negative example is derived by replacing the estimated MRI data values of the reconstructed MRI dataset that correspond to one or more randomly selected sampling locations with data values that are different from the observed MRI data values at the one or more randomly selected sampling locations.

8. The apparatus of claim 1, wherein the anchor example is derived by applying a first mask to the reconstructed MRI dataset and the under-sampled MRI dataset, the negative example is derived by applying a second mask to the reconstructed MRI dataset and the under-sampled MRI dataset, the first mask includes a first plurality of coefficients corresponding to a plurality of locations of an MRI data space, the second mask includes a second plurality of coefficients corresponding to the plurality of locations of the MRI data space, and the first plurality of coefficients differs from the second plurality of coefficients at one or more of the plurality of locations.

9. The apparatus of claim 8, wherein the first plurality of coefficients at the one or more of the plurality of locations have a value of 1, and wherein the second plurality of coefficients at the one or more of the plurality of locations have a value smaller than 1.

10. The apparatus of claim 1, wherein the anchor example and the negative example are derived via a data consistency (DC) module associated with the ML model.

11. A method for magnetic resonance imaging (MRI) reconstruction, comprising:

obtaining under-sampled MRI data; and reconstructing the under-sampled MRI data into a reconstructed MRI image based on a machine learning (ML) model, wherein the ML model is trained via contrastive learning during which:

the ML model is used to generate a reconstructed MRI dataset based on an under-sampled MRI dataset; and parameters of the ML model are adjusted based at least on an anchor example and a negative example, wherein the anchor example is derived by replacing a portion of the reconstructed MRI dataset with the under-sampled MRI dataset, and wherein the negative example is the reconstructed MRI dataset or is derived by replacing the portion of the reconstructed MRI dataset with date values that are at least partially different from the under-sampled MRI dataset.

12. The method of claim 11, wherein a positive example used for the contrastive learning is derived based on a ground truth MRI data space.

13. The method of claim 12, wherein the parameters of the ML model are adjusted during the contrastive learning to make the anchor example substantially similar to the positive example and make the anchor example substantially different from the negative example.

14. The method of claim 12, wherein the parameters of the ML model are adjusted based on a loss calculated based on the anchor example, the negative example, and the positive example.

15. The method of claim 11, wherein the under-sampled MRI dataset includes observed MRI data values that correspond to a plurality of sampling locations of an MRI data space, wherein the reconstructed MRI dataset includes estimated MRI data values that correspond to the plurality of sampling locations of the MRI data space and a plurality of non-sampling locations of the MRI data space, and wherein the anchor example is derived by replacing the estimated MRI data values of the reconstructed MRI dataset that correspond to the plurality of sampling locations with the observed MRI data values at the plurality of sampling locations.

16. The method of claim 15, wherein the negative example is derived by replacing the estimated MRI data values of the reconstructed MRI dataset that correspond to one or more randomly selected sampling locations with data values that are different from the observed MRI data values at the one or more randomly selected sampling locations.

17. The method of claim 11, wherein the anchor example is derived by applying a first mask to the reconstructed MRI dataset and the under-sampled MRI dataset, the negative example is derived by applying a second mask to the reconstructed MRI dataset and the under-sampled MRI dataset, the first mask includes a first plurality of coefficients corresponding to a plurality of locations of an MRI data space, the second mask includes a second plurality of coefficients corresponding to the plurality of locations of the MRI data space, and the first plurality of coefficients differs from the second plurality of coefficients at one or more of the plurality of locations.

18. The method of claim 17, wherein the first plurality of coefficients at the one or more of the plurality of locations have a value of 1, and wherein the second plurality of coefficients at the one or more of the plurality of locations have a value smaller than 1.

19. The method of claim 11, wherein the anchor example and the negative example used for the contrastive learning are generated at a data consistency (DC) module associated with the ML model.

20. A method implemented by a computing device during training of a machine-learning (ML) model, the method comprising:

obtaining an under-sampled magnetic resonance imaging (MRI) dataset;

generating, based on presently assigned parameters of the ML model, a reconstructed MRI dataset based on the under-sampled MRI dataset; and adjusting the presently assigned parameters of the ML model based at least on an anchor, a negative example, and a positive example, wherein:

the anchor example is derived by replacing a portion of the reconstructed MRI dataset with the under-sampled MRI dataset;

the negative example is the reconstructed MRI dataset or is derived by replacing the portion of the reconstructed MRI dataset with date values that are at least partially different from the under-sampled MRI dataset;

the positive example is derived based on a ground truth MRI dataset; and the presently assigned parameters of the ML model are adjusted with an objective to make the anchor example substantially similar to the positive example and make the anchor example substantially different from the negative example.

* * * * *